Fig.1.
Fig.7
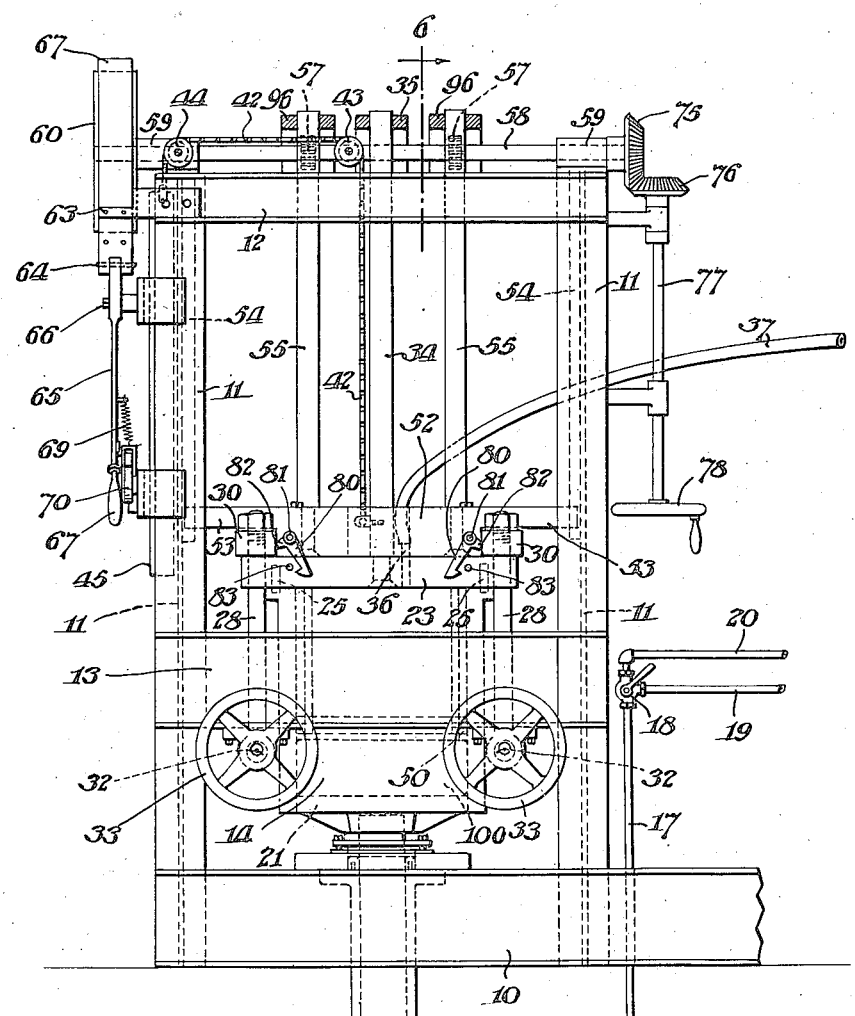
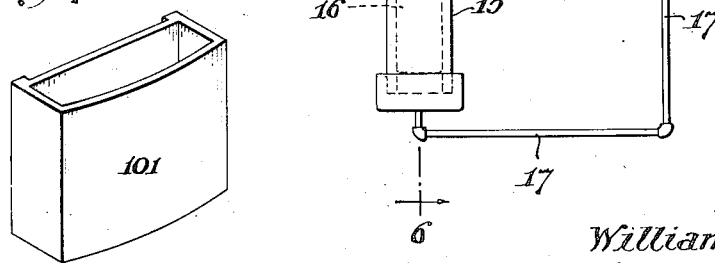

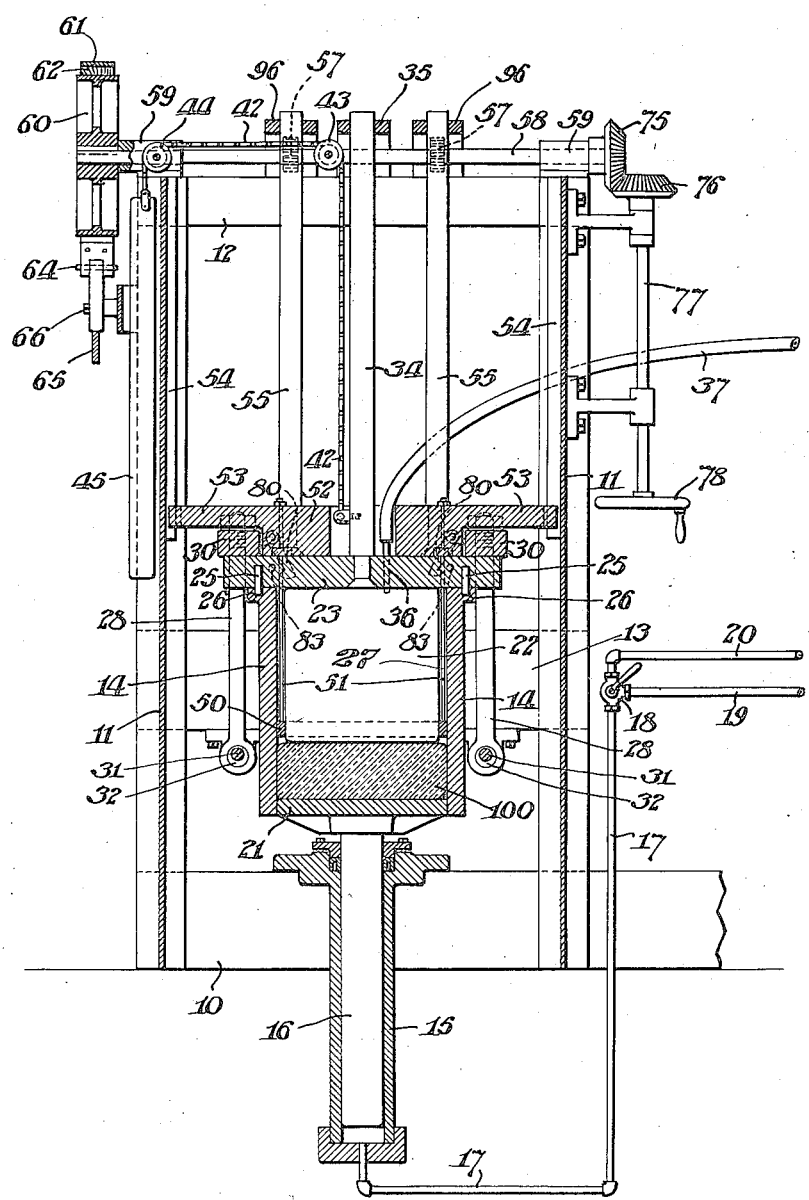

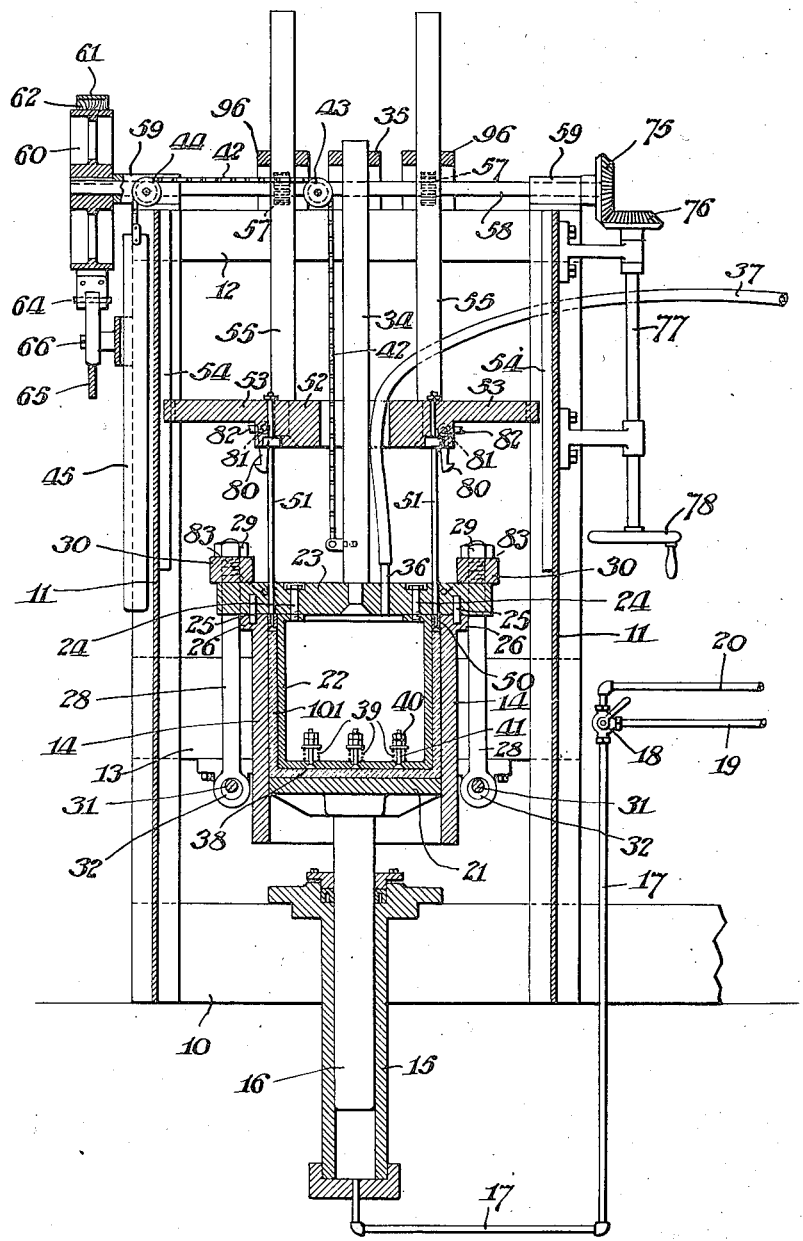

June 10, 1924.

W. G. MOLAND 1,497,191

MACHINE FOR FORMING EARTHENWARE TANKS

Filed Nov. 18, 1922     5 Sheets-Sheet 4

Inventor:
William G. Moland,
By Jas. C. Wobensmith
Attorney.

June 10, 1924.

W. G. MOLAND 1,497,191

MACHINE FOR FORMING EARTHENWARE TANKS

Filed Nov. 18, 1922   5 Sheets—Sheet 5

Inventor:
William G. Moland,
By Jas. C. Nobensmith
Attorney.

Patented June 10, 1924.

1,497,191

UNITED STATES PATENT OFFICE.

WILLIAM G. MOLAND, OF PHILADELPHIA, PENNSYLVANIA.

MACHINE FOR FORMING EARTHENWARE TANKS.

Application filed November 18, 1922. Serial No. 601,739.

*To all whom it may concern:*

Be it known that I, WILLIAM G. MOLAND, a citizen of the United States, residing at Philadelphia, in the county of Philadelphia and State of Pennsylvania, have invented certain new and useful Improvements in Machines for Forming Earthenware Tanks, of which the following is a specification.

My invention relates to a machine for forming earthenware tanks, and it relates more particularly to a machine for economically forming tanks from common clay, china clay, or similar materials.

My invention finds a valuable application in connection with the production of flush tanks for water closets and the like, enabling the same to be formed more expeditiously and economically than heretofore, but of course it should be understood that the same is equally applicable for the formation of earthenware tanks of various other shapes and sizes.

The principal object of my invention is to provide a relatively simple, yet efficient, machine for making earthenware tanks whereby the same may be produced more readily and economically than heretofore, and with such object in view my invention contemplates the provision of a machine adapted to receive a measured quantity of clay of suitable consistency or temper, and to therein press the same into the space between a mold and core, such machine being provided with suitable means for subsequently freeing the core from the interior of the formed tank and for thereafter removing the tank from the interior of the mold, these operations being carried out in such manner as to reduce to a minimum likelihood of fracture or destruction of the tank during such operations.

The nature and characteristic features of my invention will be more readily understood from the following description, taken in connection with the accompanying drawings forming part hereof, in which—

Figure 1 is a front elevation of a machine embodying the main features of my present invention, the various parts thereof being shown in the positions assumed just prior to the forming operation proper;

Fig. 2 is a vertical central section of the machine shown in Fig. 1;

Fig. 3 is a view similar to Fig. 2, but with the parts in the positions assumed at the completion of the forming operation proper;

Fig. 7 is a perspective view of a typical form of earthenware tank adapted to be formed by the use of the machine.

Figure 4:
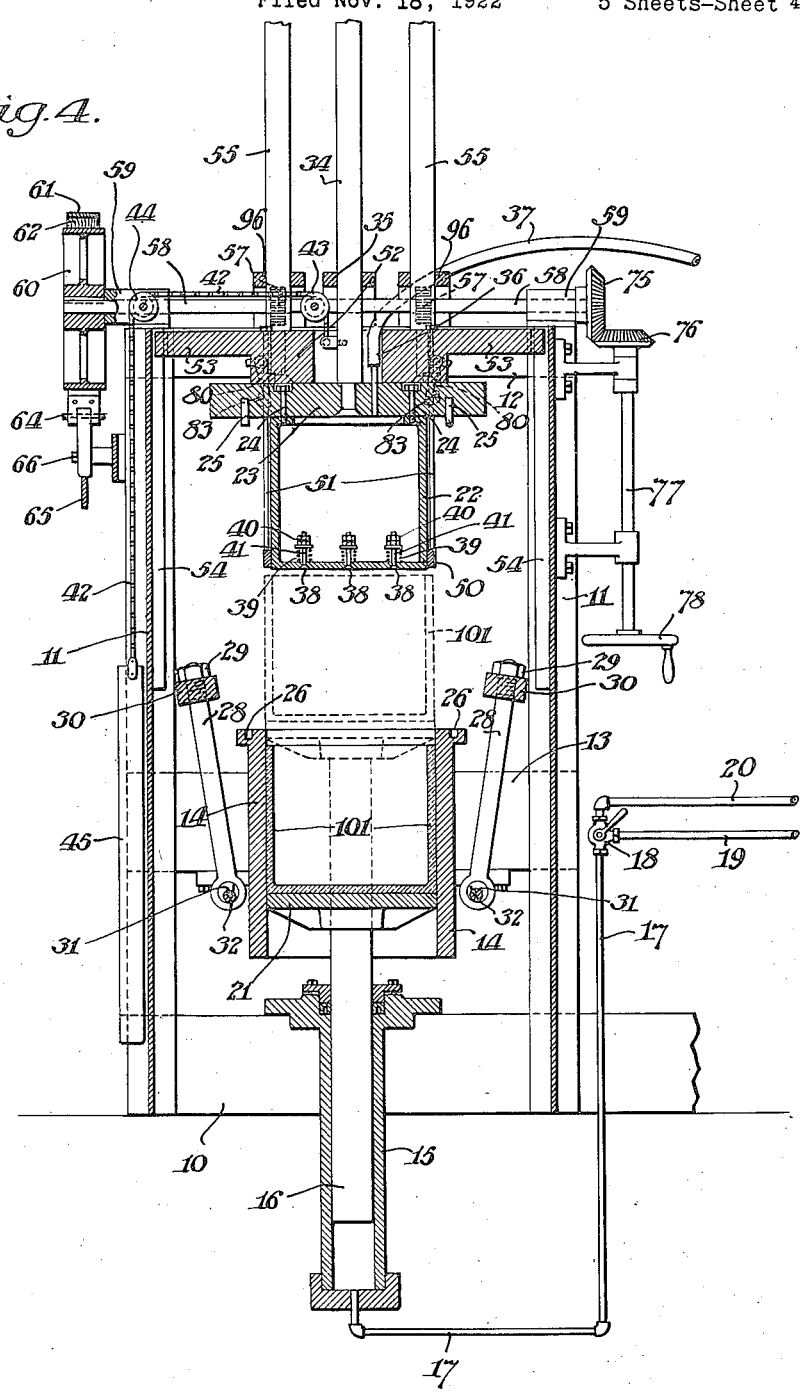
Fig. 4 is a view similar to Figs. 2 and 3, but with the parts in the positions assumed just prior to the removal of the formed earthenware tank from the interior of the mold, the core and its associated parts being shown removed from the interior thereof.

Referring to the drawings, in the particular embodiment of my invention therein shown the machine is provided with a framework which may be composed of structural shapes suitably connected to each other. Same framework may comprise bottom horizontal struts composed of channel beams 10 to which are secured vertical side uprights 11, preferably made of I beams of suitable size and strength. The vertical I beams 11 are connected at their top ends by means of channel beams 12, and are also connected intermediate their top and bottom ends by means of horizontally arranged channel beams 13.

To the channel beams 13 there is secured a mold 14, the interior of which is complemental in shape to the exterior of the earthenware tank which is to be formed therein, one form of which is illustrated in perspective in Fig. 7 of the drawings. Arranged beneath the mold 14 and supported by means of the lower horizontal channel beams 10 is a hydraulic cylinder 15 in which a plunger 16 is operatively mounted. The plunger 16 is adapted to be actuated by means of a suitable operating fluid which is supplied by means of the pipe 17, which pipe 17 extends to a three-way valve 18 of any desired type, said three-way valve 18 being also connected to a supply pipe 19 and an exhaust pipe 20. The upper end of the plunger 16, which is mounted in the hydraulic cylinder 15, is provided with a head 21, this head 21 being complemental in outline to the interior contour of the mold 14, and is adapted to be vertically moved therein. The upper surface of the plunger head 21 is preferably flat, or the same may be modified if desired, that is to say, if the bottom surface of the tank to be formed in the machine is to have any other desired shape, the upper surface of the plunger head 21 will be complementally shaped.

There is also provided a core member 22, preferably made hollow and having a yoke 23 to which the same is attached by means of bolts 24. The yoke member 23 is provided with suitable dowels 25 which are adapted to be seated in complemental recesses 26 in the upper end of the mold 14, for the purpose of properly positioning the exterior surface of the core with respect to the interior surface of the mold. The core is of such shape and dimensions with respect to the mold that there will be provided a space 27 between the exterior surface of the core 22 and the interior surface of the mold 14, this space corresponding in extent to the thickness of the vertical walls of the tank to be formed in the machine.

For the purpose of securely holding the core in its position within the mold 14 during the operation of forming the tank there are provided tension bolts 28 on each side of the mold, the upper ends of which are provided with nuts 29 which serve to confine transversely extending bars 30 which are adapted to rest upon and clamp the extending ends of the yoke member 23 to which the core 22 is secured. The lower ends of the tension bolts 28 are journalled upon eccentrics 31 carried by transversely extending shafts 32 which are adapted to be rotatively actuated by means of hand wheels 33, the eccentrics being provided for the purpose of affording a quick release of the tension on the bolts 28, whereby the bars 30 may be quickly disengaged from the projecting ends of the core yoke 23 for the purpose of releasing the same, as will be hereinafter more fully explained. Extending upward from the core yoke 23 is a guide rod 34, slidably mounted in a guide block 35 carried by the horizontal struts 12.

The hollow interior of the core 22 is adapted to be supplied, by means of a nipple 36 and flexible hose 37 connected therewith, at proper times during the operation of the machine, with a supply of air or other elastic fluid under pressure. The bottom of the core member 22 is provided with a plurality of check valves 38, the exterior surfaces of which are normally flush with the bottom surface of the core member 22. These check valves, however, are normally held closed by means of springs 39 interposed between the inner bottom surface of the core member 22 and nuts 40 which are carried on the upper ends of the valve stems 41, although it will, of course, be understood that any other type of check valve may be provided if desired, the purpose of which will be hereinafter set forth. The guide rod 34 of the core yoke 23 has secured to the lower end thereof one end of a link chain 42 which passes over suitable guide pulleys 43 and 44, and has a counterbalancing weight 45 secured to the other end thereof.

Surrounding the core member 22 is a resisting member 50, the lower surface of which is complemental in shape to the top surface of the tank to be formed in the machine. The interior contour of the resisting member 50 is complemental to the exterior surface of the core member 22, and the exterior surface of the same is complemental to the interior surface of the mold 14, this resisting member 50 being adapted to have a range of vertical movement in the space 27 between the exterior surface of the core 22 and the interior surface of the mold 14. The resisting member 50 is connected, by means of bolts 51, to a yoke member 52 arranged above the yoke member 23 of the core 22. The extending ends 53 of the yoke member 52 engage and are adapted to be guided by means of guide bars 54 which are carried by the vertical I beams 11 of the framework of the machine. The yoke member 52 is provided with vertically extending guide rods 55 slidably mounted in bearings 96 carried by the upper horizontal struts 12. The guide rods 55 are provided on one side with rack teeth 56 which are engaged by pinion gears 57 mounted upon a horizontal shaft 58 which is supported in suitable bearings 59 on the top of the framework of the machine.

Figure 5:
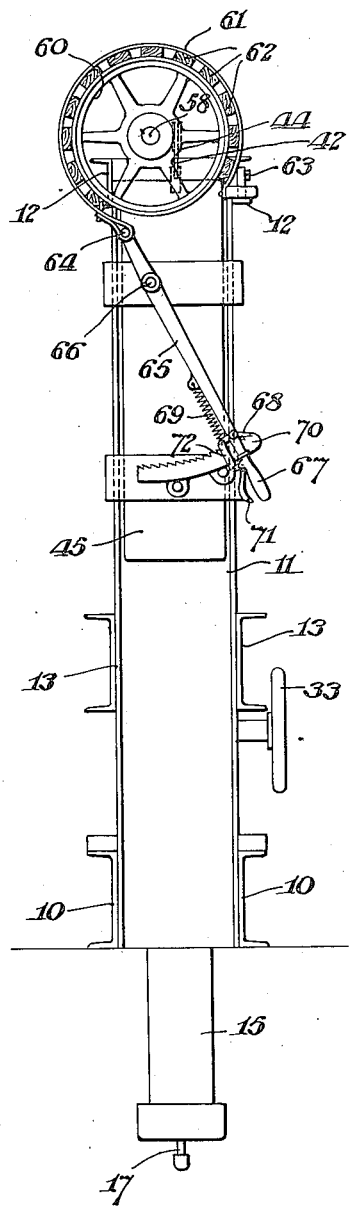
Fig. 5 is a side elevation of the machine, the parts being shown in the positions illustrated in Fig. 1.
Figure 6:
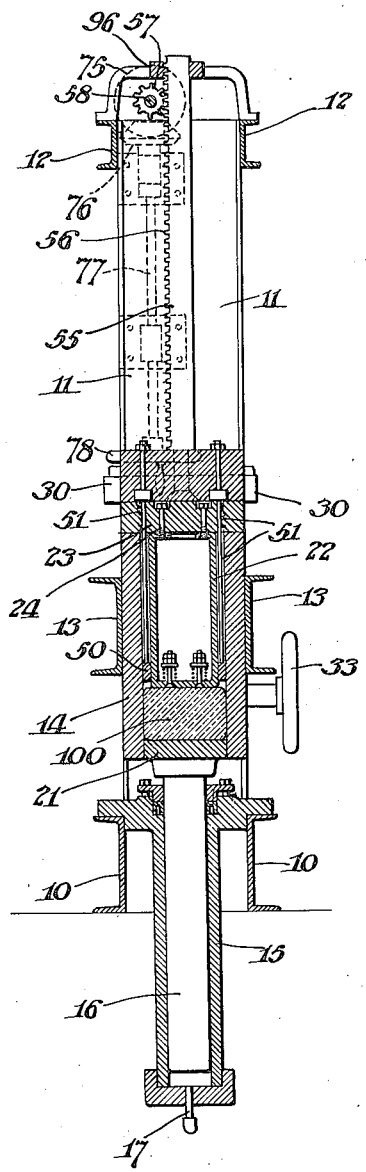
Fig. 6 is a transverse vertical section thereof, taken approximately on the line 5—5 of Fig. 1.

The shaft 58 carries at one end a friction drum 60 which is surrounded by a band 61 carrying friction blocks 62 which contact with the periphery of the friction drum 60 for the purpose of providing, when desired, a suitable frictional resistance against the turning of the shaft 58. For the purpose of regulating the amount of the frictional resistance provided by the drum 60 and the band 61 and friction blocks 62 (see Fig. 5), one end of the band 61 is fixedly secured, as at 63, to a suitable portion of the framework of the machine, while the other end thereof is pivotally connected, as at 64, to one end of a lever 65 which is pivoted, as at 66, to a suitable portion of the framework of the machine. The other end of the lever 65 is provided with a handle 67 and a pivoted dog 68 normally under the tension of the spring 69. The dog 68 engages the teeth of a ratchet sector 70, but is adapted to be released therefrom by means of a hand trigger 71 and connecting link 72, the foregoing arrangement being such that the lever 65 may be moved to any desired position and there held by means of the dog 68 and the ratchet sector 70, to provide the proper regulatable degree of frictional resistance, by means of the variable tension thus imparted to the band 61, and the friction blocks carried thereby, against the peripheral surface of the drum 60 which is carried on the end of the shaft 58.

On the end of the shaft 58 opposite from that on which the friction drum 60 is mounted, there is mounted a bevel gear 75 which meshes with and is adapted to be actuated by means of a similar bevel gear 76 which is mounted on the upper end of a vertical shaft 77, the lower end of which shaft 77 is provided with a hand wheel 78 for actuation by the operator of the machine.

Carried by the yoke 52 to which the resistance member 50 is connected by means of the bolts 51, is a series of latches 80, each pivoted as at 81, and each having projecting lugs 82 which are adapted to be encountered by the bars 30 which are carried by the tension bolts 28, the lugs 82 being provided for the purpose of swinging the latches 80 sidewise, as shown in Figure 1 of the drawings, when the tension rods 28 and the bars carried thereby are in the position for holding the core in the positions maintained during the forming of the earthenware tank within the mold 14. The core yoke 23 is provided with pins 83 which are adapted to be engaged by the latches 80 when the core 22 and its associated parts, as well as the resistance member 50, are in certain of their elevated positions for the purpose of removing the formed earthenware tank from the mold. The latches 80 coact with the pins 83 for the purpose of causing the core 22 and the resistance member 50, and their associated parts, to be raised in unison after the core has been removed from the interior of the formed tank, and also to descend in unison at the beginning of the formation of another tank in the mold.

The operation of the machine may now be explained. The plunger head 21 being initially in its lowermost position within the mold 14, and the core 22 and its associated parts being in the uppermost position, a measured quantity of clay 100, of the proper consistency or temper, is placed within the mold 14. The frictional resistance maintained by the band 61 and friction blocks 62 on the drum 60 is then released by suitable manipulation of the lever 65. The operator now actuates the hand wheel 78, the motion being transmitted by means of the vertical shaft 77 to the bevel gear 76 and thence to the bevel gear 75 which is mounted on the horizontal shaft 58, thereby rotating said shaft. The pinion gears 57, which are mounted on the shaft 58 and which engage the rack teeth 56 on the vertical guide bars 55, will thereby cause the yoke member 52 to descend, carrying with it the core yoke member 23 and the core 22 carried thereby, this against any lifting effort caused by the counterbalance weight 45, and the chain 42 by means of which said weight is connected to the guide bar 34. The tension rods 28 are now swung into position so as to bring the transverse bars 30 carried at the upper end thereof, over the projecting ends of the core yoke 23. The hand wheels 33 are now actuated, thereby turning the eccentrics 31 to quickly but positively clamp the transverse bars 30 against the projecting ends of the core yoke 23, thus securely holding the core 22 within the mold 14, the dowel pins 25 serving to insure the proper horizontal position of said core 22 with respect to the mold 14.

As the yoke members 52 and 23 descend, as aforesaid, they are held in close relationship with each other by means of the latches 80 coacting with the pins 83, but these latches, however, are released from their engagement with the pins 83 by reason of the transverse bars 30 engaging the lugs 82 of the latches 80 as the transverse bars 30 are swung into position preliminary to clamping the core yoke into position on the mold 14. By reason of the foregoing, the resistance member 50 will be positioned, at the beginning of the forming operation, in the space 27 between the core 22 and the mold 14, at a place contiguous to the lower surface of the core member 22, but, by reason of the releasing of the latches 80 from engagement with the pins 83, the resistance member will thereafter be permitted to move vertically within the space 27.

Fluid under pressure is now admitted to the hydraulic cylinder 15 by means of the three-way valve 18, whereupon a portion of the clay 100 which is resting within the mold 14, upon the surface of the plunger head 21, will be forced upward into the space 27, encountering the resistance member 50 and pushing the same upward, at the same time forming the upper surface of the earthenware tank, as well as the side walls thereof. As the forming process continues, the resistance member 50 will be retarded to such an extent as to insure the proper forming of the upper surface of the tank as well as compacting more thoroughly the materials in the side walls of the tank, this resistance or retarding action being provided by means of the mechanism hereinbefore described, comprising the bolts 51, yoke 52, guide bars 55 having the rack teeth 56, pinion gears 57, horizontal shaft 58, friction drum 60, band 61 and friction blocks 62 carried thereby, and hand lever 65. It should, of course, be understood that the hand lever 65 is moved to such position preliminary to the forming operation as to maintain, during said forming operation, the proper amount of frictional resistance during the upward movement of the member 50.

When the plunger head 21 has been actuated a sufficient distance to form the side walls of the tank within the space 27 between the core 22 and the mold 14, a sufficient quantity of the material will remain between the bottom surface of the core 22 and the top surface of the plunger head 21 to form the bottom of the tank, and when the forming operation proper is thus completed the supply of fluid under pressure is shut off for a time by suitable operation of the three-way valve 18. The various parts of the machine will now be in the positions shown in Fig. 3 of the drawings. The hand wheels 33 are now again actuated, this time to release the tension on the rods 28 sufficiently to enable the transverse bars 30 to be swung outward to release the core yoke 23. Air, or other elastic fluid under pressure, is now admitted to the interior of the hollow core 22 by means of the flexible hose 37 and nipple 36. This elastic fluid under pressure will then pass through the check valves 38, thereby releasing the clay from the bottom surface of the core, and also serving to raise the core within the interior of the tank 101 which has been formed in the mold, as hereinbefore described. As the side surfaces of the core slide upward over the interior surface of the formed tank 101, the resistance member 50 will remain in position at the top of the side walls of the tank 101, thus preventing breakage of the side walls as the core moves upward. As the core continues in its upward movement, after the side surfaces of the same have been entirely freed from contact with the interior surface of the tank 101, the core yoke 23 will encounter the yoke 52 to which the resistance member is secured by means of bolts 51, and thereafter the core 22 and resistance member 50 will continue to move upward in unison, the latches 80 coming into action and engaging the pins 83 and maintaining the resistance member 50 and its associated parts in proper position with respect to the core 22 and its associated parts. After the core has been raised to a position to free the same entirely from the formed tank, the frictional restraint of the member 50 may be released, whereupon the latches 80 will cause the core 22 and resistance member 50 and its associated parts to be thereafter actuated in unison and be raised upward a distance sufficient to permit the subsequent removal of the tank from within the mold 14, as will be hereinafter explained. The raising, as well as the subsequent lowering, of the core 22 and resistance member 50, and their associated parts, is accomplished by means of the actuation of the hand wheel 78, the motion of which is transmitted by means of the vertical shaft 77, bevel gears 76 and 75, and horizontal shaft 58 to the pinion gears 57 which engage the rack teeth 56 of the guide rods 55 which extend upward from the yoke 52 of the resistance member 50.

After the core 22 and resistance member 50, and their associated parts, are raised to their uppermost positions as aforesaid, and the various parts of the machine are in the positions shown in Fig. 4 of the drawings, fluid under pressure is again admitted to the hydraulic cylinder 15, by means of the three-way valve 18, whereupon the plunger head 21 will be forced upward until the same becomes flush with or slightly above the top of the mold 14, as shown in dotted lines in Fig. 4 of the drawings, whereupon the formed tank 101 may be slid off on to a suitable board or support and carried away for the drying, preliminary to the subsequent firing of the same.

After the formed tank 101 has been removed from the top of the plunger head 21, the three-way valve 18 may then be operated to permit the fluid within the hydraulic cylinder 15 to flow out through the exhaust pipe 20, whereupon the plunger head 21 will return to its lowermost position within the mold 14, and the machine will then be in a condition to receive another measured quantity of clay 100 for the formation of another tank within the mold 14.

It will be seen that there is thus provided a machine in which earthenware tanks may be readily and economically formed in such manner that the likelihood of breakage will be reduced to a minimum, which requires a minimum of skill on the part of the operator, and which will produce a desirable product which will be substantially uniform in character and thoroughly compacted throughout.

Having thus described the nature and characteristic features of my invention, what I claim as new and desire to secure by Letters Patent is:

1. In a machine for forming earthenware tanks, a mold, a plunger head slidably mounted therein, controllable means for applying pressure to said plunger head, a core member adapted to be supported within the mold, said core member being of such shape and dimensions with respect to the mold as to provide a space between said core member and said mold in which the tank is formed, and means for holding said core member in fixed relationship with respect to the tank during the forming operation and for thereafter withdrawing the core with respect to the mold.

2. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, and means for holding said core member in fixed relationship with respect to the tank during the forming operation and for thereafter withdrawing the core with respect to the mold.

3. In a machine for forming earthenware tanks, a mold, a plunger head slidably mounted therein, controllable means for applying pressure to said plunger head, a core member adapted to be supported within the mold, said core member being of such shape and dimensions with respect to the mold as to provide a space between said core member and said mold in which the tank is formed, a resistance member surrounding the core member and being movable with respect thereto within the space in which the tank is formed, and means for controlling the movement of said resistance member independent of said plunger head.

4. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member having its bottom surface complemental to the top edge of the tank to be formed, said resistance member being movable with respect to the core member within the space in which the tank is formed, and means for controlling the movement of said resistance member independent of said plunger head.

5. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member having its bottom surface complemental to the top edge of the tank to be formed, and being movable with respect to the core member within the space in which the tank is formed, and means for imposing a regulatable resistance on said resistance member during the forming operation.

6. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, releasable means for clamping said core member in position within said mold, a resistance member surrounding the core member having its bottom surface complemental to the top edge of the tank to be formed, and being movable with respect to the core member within the space in which the tank is formed, and means for imposing a regulatable resistance on said resistance member during the forming operation.

7. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank to be formed, said core member being of such shape and dimensions with respect to the mold as to provide a space between said core member and said mold in which the tank is formed, releasable means for clamping said core member in position within said mold, means for supplying elastic fluid under pressure to the interior of said core member, means for permitting said elastic fluid to pass from the interior of said core member to free the bottom surface of said core member from the formed tank, a resistance member surrounding the core member having its bottom surface complemental to the top edge of the tank to be formed, and being movable with respect to the core member within the space in which the tank is formed, and means for imposing a regulatable resistance on said resistance member during the forming operation.

8. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank to be formed, said core member being of such shape and dimensions with respect to the mold as to provide a space between said core member and said mold in which the tank is formed, releasable means for clamping said core member in position within said mold, means for supplying elastic fluid under pressure to the interior of said core member, means for permitting said elastic fluid to pass from the interior of said core member to free the bottom surface of said core member from the formed tank, a resistance member surrounding the core member having its bottom surface complemental to the top edge of the tank to be formed, and being movable with respect to the core member within the space in which the tank is formed, means for imposing a regulatable resistance on said resistance member during the forming operation, means for connecting the core member and the resistance member to each other at certain periods in the operation of the machine and means for arbitrarily raising and lowering said resistance member and its associated parts during certain periods in the operation of the machine.

9. In a machine for forming earthenware tanks, a mold having its interior surface complemental to the exterior surface of the tank to be formed therein, a plunger head slidably mounted therein having its top surface complemental to the bottom of the tank to be formed, a plunger upon which said plunger head is mounted, means for controlling a supply of pressure fluid for operating said plunger, a core member adapted to be supported within the mold and having its exterior surface complemental to the interior surface of the tank to be formed, said core member being of such shape and dimensions with respect to the mold as to provide a space between said core member and said mold in which said tank is formed, a resistance member surrounding the core member and having its bottom surface complemental to the top edge of the tank to be formed and being movable with respect to the core member within the space in which the tank is formed, and means for controlling the movement of said resistance member independent of said plunger head.

10. In a machine for forming earthenware tanks, a mold having its interior surface complemental to the exterior surface of the tank to be formed therein, a plunger head slidably mounted therein having its top surface complemental to the bottom of the tank to be formed, a plunger upon which said plunger head is mounted, a cylinder in which said plunger is reciprocable, a core member adapted to be supported within the mold and having its exterior surface complemental to the interior surface of the tank to be formed, said core member being of such shape and dimensions with respect to the mold as to provide a space between said core member and said mold in which said tank is formed, a resistance member surrounding the core member and having its bottom surface complemental to the top edge of the tank to be formed and being movable with respect to the core member within the space in which the tank is formed and means for controlling the movement of said resistance member independent of said plunger head.

11. In a machine for forming earthenware tanks, a mold having its interior surface complemental to the exterior surface of the tank to be formed therein, a plunger head slidably mounted therein having its top surface complemental to the bottom of the tank to be formed, a plunger upon which said plunger head is mounted, a cylinder in which said plunger is reciprocable, means for controlling a supply of pressure fluid for operating said plunger, a core member adapted to be supported within the mold and having its exterior surface complemental to the interior surface of the tank to be formed, said core member being of such shape and dimensions with respect to the mold as to provide a space between said core member and said mold in which said tank is formed, a resistance member surrounding the core member and having its bottom surface complemental to the top edge of the tank to be formed and being movable with respect to the core member within the space in which the tank is formed, and means for controlling the movement of said resistance member independent of said plunger head.

12. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank, said core member being of such shape and dimensions with respect to the mold as to provide a space between said core member and said mold in which the tank is formed, means for holding said core member in fixed relationship with respect to the tank during the forming operation and for thereafter withdrawing the core with respect to the mold, and means for supplying elastic fluid under pressure between the bottom of said core member and the inner bottom surface of the formed tank to thereby free said core member from the formed tank.

13. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank, said core member being of such shape and dimensions with respect to the mold as to provide a space between said core member and said mold in which the tank is formed, means for supplying elastic fluid under pressure to the interior of said core member and for permitting said elastic fluid to pass from the interior of said core member to free the bottom surface of said core member from the formed tank, a resistance member surrounding the core member and having its bottom surface complemental to the top edge of the tank to be formed, and being movable with respect to the core member within the space in which the tank is formed, and means for controlling the movement of said resistance member independent of said plunger head.

14. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank, said core member being of such shape and dimensions with respect to the mold as to provide a space between said core member and said mold in which the tank is formed, means for holding said core member in fixed relationship with respect to the tank during the forming operation and for thereafter withdrawing the core with respect to the mold, means for supplying elastic fluid under pressure to the interior of said core member, and check valves located at the bottom of said core member to permit said elastic fluid to pass from the interior of said core member to free the bottom surface of said core member from the formed tank.

15. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a hollow core member adapted to be supported within the mold and having its exterior surface complemental to the interior surface of the tank, said core member being of such shape and dimensions with respect to the mold as to provide a space between said core member and said mold in which the tank is formed, means for supplying elastic fluid under pressure to the interior of said core member, check valves located at the bottom of said core member to permit said elastic fluid to pass from the interior of said core member to free the bottom surface of said core member from the formed tank, a resistance member surrounding the core member and having its bottom surface complemental to the top edge of the tank to be formed, and being movable with respect to the core member within the space in which the tank is formed, and means for controlling the movement of said resistance member independent of said plunger head.

16. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, and means for clamping and releasing said core member with respect to said mold, and a resistance member surrounding the core member and having its bottom surface complemental to the top edge of the tank to be formed, and being movable with respect to the core member within the space in which the tank is formed.

17. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, and means for manually effecting the clamping and releasing of said yoke member.

18. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, bars adapted to clamp the ends of said yoke member, and means for manually effecting the clamping and releasing of said clamping bars.

19. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, bars adapted to clamp the ends of said yoke member, tension rods upon which said clamping bars are carried, eccentrics upon which said tension rods are pivotally mounted, and means for manually rotating said eccentrics to effect the clamping and releasing of said clamping bars.

20. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, bars adapted to clamp the ends of said yoke member, tension rods upon which said clamping bars are carried, eccentrics upon which said tension rods are pivotally mounted, means for manually rotating said eccentrics to effect the clamping and releasing of said clamping bars, and a resistance member surrounding the core member and having its bottom surface complemental to the top edge of the tank to be formed, and being movable with respect to the core member within the space in which the tank is formed.

21. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, and controllable resistance mechanism operatively connected with said yoke member.

22. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, a friction drum operatively connected with said yoke member, a brake band surrounding said friction drum, and means for arbitrarily varying the tension of said brake band.

23. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, a friction drum operatively connected with said yoke member, a brake band surrounding said friction drum, and means for arbitrarily varying the tension of said brake band comprising a hand lever and manually controllable ratchet mechanism operatively associated therewith.

24. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, guide rods carried by said yoke member, said guide rods having rack teeth on one side thereof, pinions engaging the rack teeth of said guide rods, a shaft upon which said pinions are secured, and controllable resistance mechanism operatively associated with said shaft.

25. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, guide rods carried by said yoke member, said guide rods having rack teeth on one side thereof, pinions engaging the rack teeth of said guide rods, a shaft upon which said pinions are secured, a friction drum mounted on said shaft, a brake band surrounding said friction drum, and means for arbitrarily varying the tension of said brake band.

26. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, guide rods carried by said yoke member, said guide rods having rack teeth on one side thereof, pinions engaging the rack teeth of said guide rods, a shaft upon which said pinions are secured, a friction drum mounted on said shaft, a brake band surrounding said friction drum, and means for arbitrarily varying the tension of said brake band comprising a hand lever and manually controllable ratchet mechanism operatively associated therewith.

27. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, a resistance member surrounding the core member and movable with respect thereto within the space in which the tank is formed, a yoke member to which said resistance member is connected, and mechanism connected to the resistance yoke member for raising and lowering the same and its associated parts.

28. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a resistance member surrounding the core member and movable with respect thereto within the space in which the tank is formed, a yoke member to which said resistance member is connected, mechanism connected to the resistance yoke member for raising and lowering the same and its associated parts, and means for connecting said yoke members to each other to cause said yoke members and their associated parts to be actuated in unison during certain periods in the operation of the machine.

29. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, a resistance member surrounding the core member and movable with respect thereto within the space in which the tank is formed, a yoke member to which said resistance member is connected, mechanism connected to the resistance yoke member for raising and lowering the same and its associated parts, and latches pivotally connected to one of said yoke members and adapted to engage suitable projections on the other of said yoke members, said latches being adapted to cause said yoke members and their associated parts to be actuated in unison during certain periods in the operation of the machine.

30. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, a resistance member surrounding the core member and movable with respect thereto within the space in which the tank is formed, a yoke member to which said resistance member is connected, manually operable mechanism connected to the resistance yoke member for arbitrarily raising and lowering the same and its associated parts, and latches pivotally connected to one of said yoke members and adapted to engage suitable projections on the other of said yoke members, said latches being adapted to cause said yoke members and their associated parts to be actuated in unison during certain periods in the operation of the machine.

31. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, bars adapted to clamp the ends of said yoke member, means for effecting the clamping and releasing of said clamping bars, a resistance member surrounding the core member and movable with respect thereto within the space in which the tank is formed, a yoke member to which said resistance member is connected, manually operable mechanism connected to the resistance yoke member for arbitrarily raising and lowering the same and its associated parts, latches pivotally connected to one of said yoke members and adapted to engage suitable projections on the other of said yoke members, said latches being adapted to cause said yoke members and their associated parts to be actuated in unison during certain periods in the operation of the machine, and said latches being provided with lugs adapted to be encountered by the clamping bars to release said latches when said yoke members are in their lowermost positions.

32. In a machine for forming earthenware tanks, a mold having its interior surface complemental to the exterior surface of the tank to be formed therein, a plunger head slidably mounted therein having its top surface complemental to the bottom of the tank to be formed, controllable means for applying pressure to said plunger head, a core member adapted to be supported within the mold and having its exterior surface complemental to the interior surface of the tank to be formed, said core member being of such shape and dimensions with respect to the mold as to provide a space between said core member and said mold in which the tank is formed, a yoke member supporting said core member, bars adapted to clamp the ends of said yoke member, means for effecting the clamping and releasing of said clamping bars, a resistance member surrounding the core member and movable with respect thereto within the space in which the tank is formed, a yoke member to which said resistance member is connected, manually operable mechanism connected to the resistance yoke member for arbitrarily raising and lowering the same and its associated parts, latches pivotally connected to said resistance yoke member and adapted to engage suitable projections on the core yoke member, said latches being adapted to cause said yoke members and their associated parts to be actuated in unison during certain periods in the operation of the machine, and said latches being provided with lugs adapted to be encountered by the clamping bars to release said latches when said yoke members are in their lowermost positions.

In testimony whereof, I have hereunto signed my name.

WILLIAM G. MOLAND.